(12) United States Patent  
Nakagawa et al.

(10) Patent No.: US 9,291,705 B2  
(45) Date of Patent: Mar. 22, 2016

(54) SIGNAL PROCESSING DEVICE, SIGNAL PROCESSING METHOD, COMPUTER READABLE MEDIA STORING SIGNAL PROCESSING PROGRAM AND RADAR APPARATUS

(71) Applicant: Furuno Electric Company, Limited, Nishinomiya, Hyogo (JP)

(72) Inventors: Kazuya Nakagawa, Nishinomiya (JP); Yasunobu Asada, Nishinomiya (JP)

(73) Assignee: FURUNO ELECTRIC COMPANY LIMITED, Hyogo (JP)

( * ) Notice: Subject to any disclaimer, the term of this patent is extended or adjusted under 35 U.S.C. 154(b) by 406 days.

(21) Appl. No.: 13/922,054

(22) Filed: Jun. 19, 2013

(65) Prior Publication Data

US 2013/0342381 A1    Dec. 26, 2013

(30) Foreign Application Priority Data

Jun. 20, 2012 (JP) ................................. 2012-138412

(51) Int. Cl.
  *G01S 7/02* (2006.01)
  *G01S 7/292* (2006.01)
  *G01S 13/28* (2006.01)

(52) U.S. Cl.
  CPC ............... *G01S 7/292* (2013.01); *G01S 7/023* (2013.01); *G01S 13/28* (2013.01); *G01S 7/2926* (2013.01); *G01S 7/2927* (2013.01)

(58) Field of Classification Search
  CPC ....... G01S 7/023; G01S 7/292; G01S 7/2922; G01S 7/2926; G01S 7/2927; G01S 13/28
  USPC ................ 342/70–72, 89, 159–164, 175, 195
  See application file for complete search history.

(56) References Cited

U.S. PATENT DOCUMENTS

| 5,495,249 | A  | * | 2/1996  | Chazelle  | G01S 7/032 342/146 |
| 5,539,412 | A  | * | 7/1996  | Mendelson | G01R 23/16 324/76.19 |
| 7,375,676 | B1 | * | 5/2008  | Loberger  | G01S 7/2928 342/160 |
| 8,035,551 | B1 | * | 10/2011 | Govoni    | G01S 7/292 342/132 |
| 2008/0174475 | A1 | * | 7/2008 | Clark    | G01S 13/5246 342/160 |
| 2009/0096662 | A1 | * | 4/2009 | Wang     | G01S 13/5248 342/93 |
| 2009/0103595 | A1 | * | 4/2009 | Watanabe | G01S 7/526 375/219 |
| 2009/0109083 | A1 | * | 4/2009 | Tietjen  | G01S 13/28 342/91 |
| 2009/0201766 | A1 | * | 8/2009 | Nishida  | G01S 7/524 367/134 |
| 2010/0073218 | A1 | * | 3/2010 | Stockmann | G01S 13/5248 342/146 |
| 2012/0256780 | A1 | * | 10/2012 | Shoji   | G01S 13/18 342/101 |

FOREIGN PATENT DOCUMENTS

JP        2008-96337 A    4/2008

* cited by examiner

*Primary Examiner* — Peter Bythrow  
(74) *Attorney, Agent, or Firm* — Global IP Counselors, LLP

(57) ABSTRACT

A signal processing device is provided. The device includes a signal input unit for receiving reception signals obtained from transmission signals reflecting on one or more objects, a pulse compressor for pulse compressing the reception signals, an interference detector for detecting a reception signal caused by interference, from the pulse-compressed reception signals, a signal level controlling module for controlling a level of the detected reception signal, and an interpolation processing module for interpolating the level-controlled reception signal in an azimuth direction.

19 Claims, 9 Drawing Sheets

ECHO IMAGE BEFORE PULSE COMPRESSION

ECHO IMAGE AFTER PULSE COMPRESSION

ECHO IMAGE AFTER INTERFERENCE REMOVAL

ECHO IMAGE AFTER COHERENT INTEGRATION

SIGNAL PROCESSING DEVICE, SIGNAL PROCESSING METHOD, COMPUTER READABLE MEDIA STORING SIGNAL PROCESSING PROGRAM AND RADAR APPARATUS

CROSS-REFERENCE TO RELATED APPLICATION(S)

The application claims priority under 35 U.S.C. §119 to Japanese Patent Application No. 2012-138412, which was filed on Jun. 20, 2012, the entire disclosure of which is hereby incorporated by reference.

TECHNICAL FIELD

The present invention relates to a signal processing device for performing various kinds of processing on a reception signal.

BACKGROUND OF THE INVENTION

Conventionally, with radar apparatuses, pulse compression is performed on reception signals to improve a resolution in a distance direction (JP2008-096337A). The reception signals include a signal (interference signal) which is caused by an influence of, for example, an electromagnetic wave transmitted to a ship equipped with the radar apparatus from another ship and does not continue in an azimuth direction.

Therefore, processing of removing an interference component from the reception signals (e.g., processing of replacing the level of a sudden high level signal to zero).

However, depending on the contents of the interference removing processing, an appropriate echo cannot be displayed. For example, as described above, when the level of the reception signal determined to be the interference component is replaced to zero, only the part of the reception signal becomes zero. Therefore, an image with a partial lack of echo image is displayed, and results in degrading a display quality as the radar apparatus.

SUMMARY OF THE INVENTION

Thus, the present invention is made in view of the above situation, and provides a signal processing device that appropriately interpolates for an interference component while performing a pulse compression.

According to an aspect of the invention, a signal processing device is provided. The device includes a signal input unit for receiving reception signals obtained from transmission signals reflecting on one or more objects, a pulse compressor for pulse compressing the reception signals, an interference detector for detecting a reception signal caused by interference, from the pulse-compressed reception signals, a signal level controlling module for controlling a level of the detected reception signal, and an interpolation processing module for interpolating the level-controlled reception signal in an azimuth direction.

Interference has a characteristic in which its level sharply rises and then sharply falls in the azimuth direction. In the pulse compression, a correlation calculation between a reference signal (such as the transmission signal) and the reception signal. Therefore, although the interference component is extended in a distance direction after the pulse compression, the characteristic in which its level sharply falls after sharply rising in the azimuth direction does not change.

The interpolation processing module may interpolate the level-controlled reception signal in the azimuth direction by integrating the level-controlled reception signals.

The interference detector may also detect a signal caused by interference before the pulse compression, from the reception signals inputted into the signal input unit. The signal level controlling module may control the level of the reception signal detected by the interference detection before the pulse compression.

The interference detector may include a level change detecting module for detecting a level change between the reception signals from sampling locations close to each other where the distances from an antenna are substantially the same but the azimuths from the antenna are different, the antenna receiving the reception signals. The interference detector may also include a pattern output module for comparing the level change with a predetermined reference pattern and outputting a level change pattern. The interference detector may also include an interference determining module for determining the interference based on at least two of the level change patterns.

The pattern output module may compare the level change of the reception signals from adjacent sampling locations with the predetermined reference pattern.

The pattern output module may classify the pattern into one of a first pattern in which the level change exceeds a first threshold, a second pattern in which the level change is below a second threshold, and a third pattern in which the level change applies to neither the first pattern nor the second pattern.

The interference determining module may output an identified signal indicating interference when the pattern changes from the first pattern to the second pattern.

The interference determining module may output an identified signal indicating interference when the pattern changes from the first pattern to the third pattern.

The interference determining module may output an identified signal indicating interference when the pattern changes from the third pattern to the second pattern.

The level change may be based on a difference value between the levels of the reception signals adjacent to each other in the azimuth direction.

The interference determining module may output an identified signal indicating interference when the third pattern following the first pattern and a group of at least two of the continuous third patterns exist.

The interference determining module may output an identified signal indicating interference when a group of at least two of the continuous third patterns and the second pattern following the third pattern exist.

The interference determining module may output an identified signal indicating interference when a group of at least two of the continuous first patterns exists.

The interference determining module may output an identified signal indicating interference when a group of at least two of the continuous second patterns exists.

The level change detector may average the level changes in the distance direction. The pattern output module may compare the averaged level change with the level change pattern.

The level change detector may further detect a level change between the reception signals from locations close to each other where the azimuths from an antenna are substantially the same but the distances from the antenna are different, the antenna receiving the reception signals. The pattern output module may output the most frequent level change pattern within a predetermined distance range as the level change pattern for the azimuth and the distance.

The level change detector may further detect a level change between the reception signals from locations close to each other where the azimuths from an antenna are substantially the same but the distances from the antenna are different, the antenna receiving the reception signals. The interference determining module may further determine interference based on a plurality of level change patterns close to each other in the distance direction.

The signal level controlling module may perform zero conversion on the level of the reception signal caused by interference.

According to another aspect of the invention, a radar apparatus is provided. The apparatus includes an antenna for discharging transmission signals using electromagnetic waves respectively in each azimuth, and for receiving signals obtained by reflecting on one or more objects. The apparatus includes a pulse compressor for pulse compressing the reception signals. The apparatus includes an interference detector for detecting a signal caused by interference from the pulse-compressed reception signals. The apparatus includes a signal level controlling module for controlling a level of the reception signal caused by interference that is detected by the interference detector. The apparatus includes an interpolation processing module for interpolating the level-controlled reception signal in an azimuth direction.

According to another aspect of the invention, a method of processing signal is provided. The method includes inputting reception signals according to echo intensities of transmission signals, pulse compressing the receptions signals, detecting a signal caused by interference from the pulse-compressed reception signals, controlling a level of the reception signal caused by interference that is detected by the detecting the signal caused by interference, and interpolating in an azimuth direction the level-controlled reception signal.

According to the echo signal processing device of the aspects of the present invention, the interference component can be appropriately interpolated while performing pulse compression.

BRIEF DESCRIPTION OF THE DRAWINGS

The present disclosure is illustrated by way of example and not by way of limitation in the figures of the accompanying drawings, in which the like reference numeral indicate like elements and in which.

DETAILED DESCRIPTION

Figure 1A:
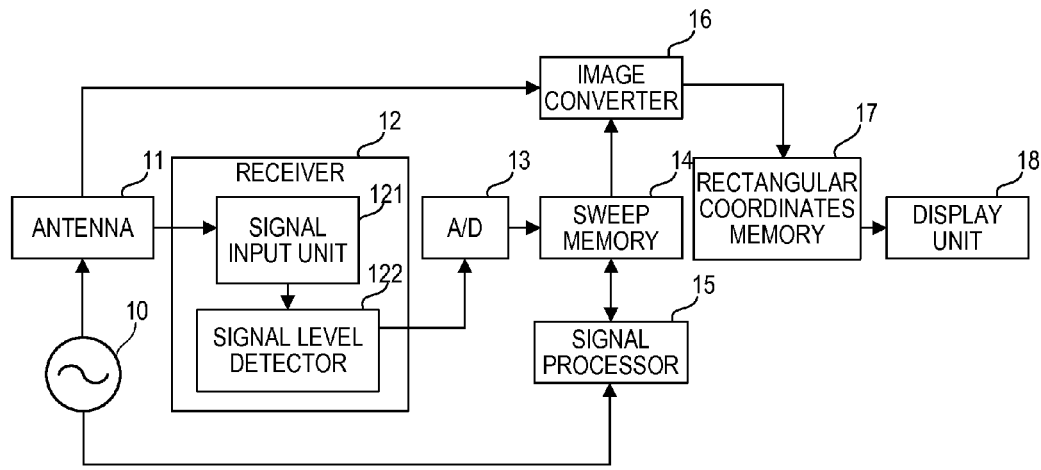
FIG. 1A to 1C are block diagrams showing a configuration of a radar apparatus of one embodiment of the invention.

A signal processing device of one embodiment includes a signal input unit, a pulse compressor, an interference detector, a signal level controlling module, and an interpolation processing module. The signal input unit receives reception signals according to echo intensities of transmission signals. The pulse compressor pulse compresses the reception signals. The interference detector detects a signal caused by interference, from the pulse-compressed reception signals. The signal level controlling module controls a level of the reception signal caused by the interference that is detected by the interference detector. The interpolation processing module interpolates the level-controlled reception signal in an azimuth direction.

Interference has a characteristic in which its level sharply rises and then sharply falls in the azimuth direction. In the pulse compression, a correlation calculation between a reference signal (such as the transmission signal) and the reception signal. Therefore, although the interference component is extended in a distance direction after the pulse compression, the characteristic in which its level sharply falls after sharply rising in the azimuth direction does not change.

The signal processing device of this embodiment performs the interpolation processing of the reception signal in the azimuth direction after removing the interference component (e.g., zero-replacement) after the pulse compression. Thus, the reception signal does not sharply fall down in a certain azimuth even when the interference removal is performed after the pulse compression. In this manner, appropriate pulse compression can be performed while easing an effect from the interference.

Although various methods for the interpolation may be considered, such as linear interpolation, the reception signal after the level control may be averaged (integrated) in the azimuth direction. Especially, by performing a coherent integration, the interpolation processing of removing the interference may be performed while improving the S/N.

The interference detector may also detect the signal caused by interference before the pulse compression, from the reception signals inputted from the signal input unit. The signal level controlling module may control the level of the reception signal caused by interference detected by the interference detection before the pulse compression.

In a situation where an echo from a target object is not included in the reception signals (only noise) and the interference component is contained in the reception signal, by removing the interference before performing the pulse compression, an unnecessary component such as interference will not be produced after the pulse compression. In this case, since interference will not be detected in the interference detection processing after the pulse compression, another processing, such as interference removal, will not be newly required after the pulse compression. Note that, in the situation where the echo from the target object is contained in the reception signals, even when the interference removing processing is performed before the pulse compression, the signal(s) will be partially lacked from the echo, and there is a possibility that an unnecessary high level signal (two-dimensional interference) is produced in addition to the echo due to the correlation. Note that, such two-dimensional interference will newly be detected as an interference component by the interference detection processing after the pulse compression, and the removal and interpolation processing is performed. Therefore, an appropriate signal as the echo can be obtained.

The interference detection is desired to be performed as follows. Specifically, the interference detector may include a signal level detecting module, a level change detecting module, a pattern output module, and an interference determining module. The signal level detecting module detects levels of the reception signals in association with distance and azimuth directions from an antenna. The level change detecting module detects a level change between the reception signals from sampling locations close to each other (e.g. difference value) where the distances from the antenna are substantially the same but the azimuths from the antenna are different, the antenna transmitting the transmission signals.

The pattern output module compares the level change with a predetermined reference pattern and outputs a level change pattern. For example, the level changes are classified into patterns such as reception signal data x(n−1) of a sweep n−1 is smaller than data x(n) of a sweep n which is next to the sweep n−1 (first pattern P), the reception signal data x(n−1) of the sweep n−1 is larger than the data x(n) of the next sweep n (second pattern N), and the level change applies to neither the first pattern nor the second pattern (third pattern Z).

The interference determining module determines interference based on at least two of the level change patterns. For example, when a change pattern between the data x(n−1) of the observing sweep n−1 and data x(n−2) of a sweep n−2 which is one sweep before the sweep (n−1) is the pattern P, and a change pattern between the data x(n−1) and the data x(n) of a sweep which is next to the data x(n−1) is the pattern N, it is determined as interference. When it is determined as interference, the interference determining module outputs an identified signal indicating the interference. The signal level controlling module receives the outputted signal, and the interference is removed as described above. This is similar in the following descriptions as well.

The interference may occur continuously for a plurality of times in the azimuth direction. It may be determined as interference when the level change pattern between the data x(n−1) of the observing sweep n−1 and the data x(n−2) of the sweep n−2 is the pattern P, and the level change pattern between the data x(n−1) of the observing sweep n−1 and the data x(n−2) of the sweep n−2 is the pattern Z. It may also be determined as interference when the level change pattern between the data x(n−1) of the observing sweep n−1 and the data x(n−2) of the sweep n−2 is the pattern Z and when the level change pattern between the data x(n−1) and the data x(n) is the pattern N.

From the above determination, a level change pattern peculiar to the interference component in which its level sharply falls after sharply rising in the azimuth direction, can be extracted. In this case, it becomes possible to only extract the interference component accurately compared to the conventional method which applies the pattern with the lowest level out of several sweeps (e.g., three sweeps) (the method in which because the interference removal is performed for the entire echo data, the pulse compression and signal phase cannot be used).

If a threshold is calculated every time as described in JP2008-096337A, for example, a method for keeping a plurality of sweep data on a time axis about a certain position and setting a signal level in an arbitrary order from the highest level signal as a reference (taking an order statistics) may be considered. In contrast, the method of this embodiment does not require such complicated processing.

Moreover, in the signal processing device of this embodiment, not only the three data of the sweeps (the observing sweep, and adjacent sweeps to the observing sweep) but also a larger number of data of sweeps may be used. For example, it is determined as interference when the level change pattern between data x(n−4) of a sweep n−4 (two sweeps before the data x(n−2) of the observing sweep n−2) and data x(n−3) of a sweep n−3 (immediate previous sweep of the data x(n−2) of the observing sweep n−2) is the pattern P, when the level change pattern from the data x(n−3) to the data x(n−2) is the pattern Z, and when the level change pattern from the data x(n−2) to the data x(n−1) is the pattern Z. It may also be determined as interference when the level change pattern between the data x(n−3) and the data x(n−2) is the pattern Z, when the level change pattern between the data x(n−2) and the data x(n−1) is the pattern Z, and when the level change pattern between the data x(n−1) and the data x(n) is the pattern N. Thus, the continuous interference component in the azimuth direction can be detected.

Moreover, if the plurality of continuous level change patterns in the azimuth direction are continuously the pattern P, it can be determined as the interference components. For example, it may be determined as interference when the level change pattern from the data x(n−4) to the data x(n−3) is the pattern P, and the level change pattern from the data x(n−3) to the data x(n−2) is the pattern P. It may also be determined as interference when the level change pattern from the data x(n−3) to the data x(n−2) is the pattern P, and the level change pattern from the data x(n−2) to the data x(n−1) is the pattern P.

If the plurality of continuous level change patterns in the azimuth direction are continuously the pattern N, it can be determined as the interference components. For example, it may be determined as interference when the level change pattern from the data x(n−3) to the data x(n−2) is the pattern N, and the level change pattern from the data x(n−2) to the data x(n−1) is the pattern N. It may also be determined as interference when the level change pattern from the data x(n−2) to the data x(n−1) is the pattern N, and the level change pattern from the data x(n−1) to the data x(n) is the pattern N. In this case, the interference components having different signal levels in the azimuth direction can be detected.

The signal processing device of this embodiment be configured taking level changes in the distance direction into consideration. For example, the level change detecting module may average the level changes in each azimuth by using signals in the distance direction. In this case, the pattern output module compares the averaged level change with the level change pattern. Alternatively, adjacent level changes in the distance direction may further be detected, and output the most frequent level change pattern within a predetermined distance range, as the level change pattern in each azimuth and distance.

Hereinafter, another embodiment of the invention is described in detail with reference to the accompanying drawings.

FIG. 1A is a block diagram showing a configuration of a radar apparatus that is built therein with a signal processing device of the claims. The radar apparatus is installed in, for example, a ship (hereinafter, it may be referred to as "the ship concerned" or may be simply referred to as "the ship"), and transmits and receives electromagnetic waves around the ship so as to detect a target object such as another ship.

In FIG. 1A, the radar apparatus includes a transmitter 10 (magnetron), an antenna 11, a receiver 12, an A/D converter 13, a sweep memory 14, a signal processor 15, an image converter 16, a rectangular coordinate memory 17, and a display unit 18.

The radar apparatus introduces an electromagnetic wave (transmission signal) outputted from the transmitter 10 to the antenna 11 via a circulator (not illustrated), and discharges the electromagnetic wave in each azimuth around the ship. A reception signal from outside is received by the antenna 11 and introduced to the receiver 1 2 via the circulator.

The receiver 12 includes, as its function, a signal input unit 121 and a signal level detector 122. The signal input unit 121 is inputted with the reception signal and outputs it to the signal level detector 122. The signal level detector 122 detects a level of the reception signal in association with distance and azimuth from the antenna 11, and outputs to the A/D converter 13a a value corresponding to the level of the reception signal. The A/D converter 13 converts the inputted reception signal of an analog value into a digital value and outputs it to the sweep memory 14 as measurement data.

The sweep memory 14 stores the measurement data for one measurement cycle (for 360° around the ship). Each measurement data is associated with an azimuth and a distance in a polar coordinate system, and stored as sample data (sweep data) of a complex signal having phase information.

The signal processor 15 performs a pulse compression on the sweep data of each azimuth by a correlation calculation with a predetermined pulse compression coefficient (created based on the transmission signal, and here, same as the transmission signal). An interference component is detected from the pulse-compressed sweep data, and processing of removing the interference component is performed. By the above processing, the signal processor 15 updates the sweep data.

After this signal processing, the image converter 16 is inputted with the sweep data from the sweep memory 14, converts it to be in association with a rectangular coordinate system having a position of the ship as its origin, and outputs it as a pixel intensity value of a gradation corresponding to the level of each sweep data. The pixel intensity value of the rectangular coordinate system is stored in the rectangular coordinate memory 17 as rectangular coordinate data.

The display 18 reads out the rectangular coordinate data stored in the rectangular coordinate memory 17 and displays it as a radar image (echo image) as shown in FIGS. 9A to 9D. In this embodiment, an example where a background color is a light color (e.g., white) and pixels with higher pixel intensity values are displayed in darker colors in gray scale is described. Conversely, the background color may be a dark color (e.g., black) and the pixels with higher pixel intensity values may be displayed in lighter colors in the gray scale. Alternatively, they may be displayed as a color image.

The reception signal received by the antenna 11 includes an echo signal obtained by the electromagnetic wave reflecting on the target object, and, in some cases, also an interference component which is an electromagnetic wave discharged from, for example, another ship. The interference component has a characteristic in which its level sharply rises and then sharply falls in an azimuth direction. Although the interference component is extended in a distance direction after the pulse compression, the characteristic in which its level sharply falls after sharply rising in the azimuth direction does not change. Therefore, when the reception signal includes the interference component, a long and thin echo image extending in the distance direction is displayed even if the pulse compression is performed.

Thus, the radar apparatus of this embodiment detects the interference component by the signal processor 15 and performs a level reduction thereof (e.g., zero-replacement processing). When the zero-replacement processing is performed, an image with a lack of echo image in the zero-replaced part is displayed and the display quality degrades. Therefore, processing of interpolating the sweep data in the azimuth direction is performed. As a result, the image converter 16 is only inputted with the sweep data of which only the interference component is reduced, and the echo image where only the interference component is accurately removed is displayed on the display unit 18.

Figure 7:
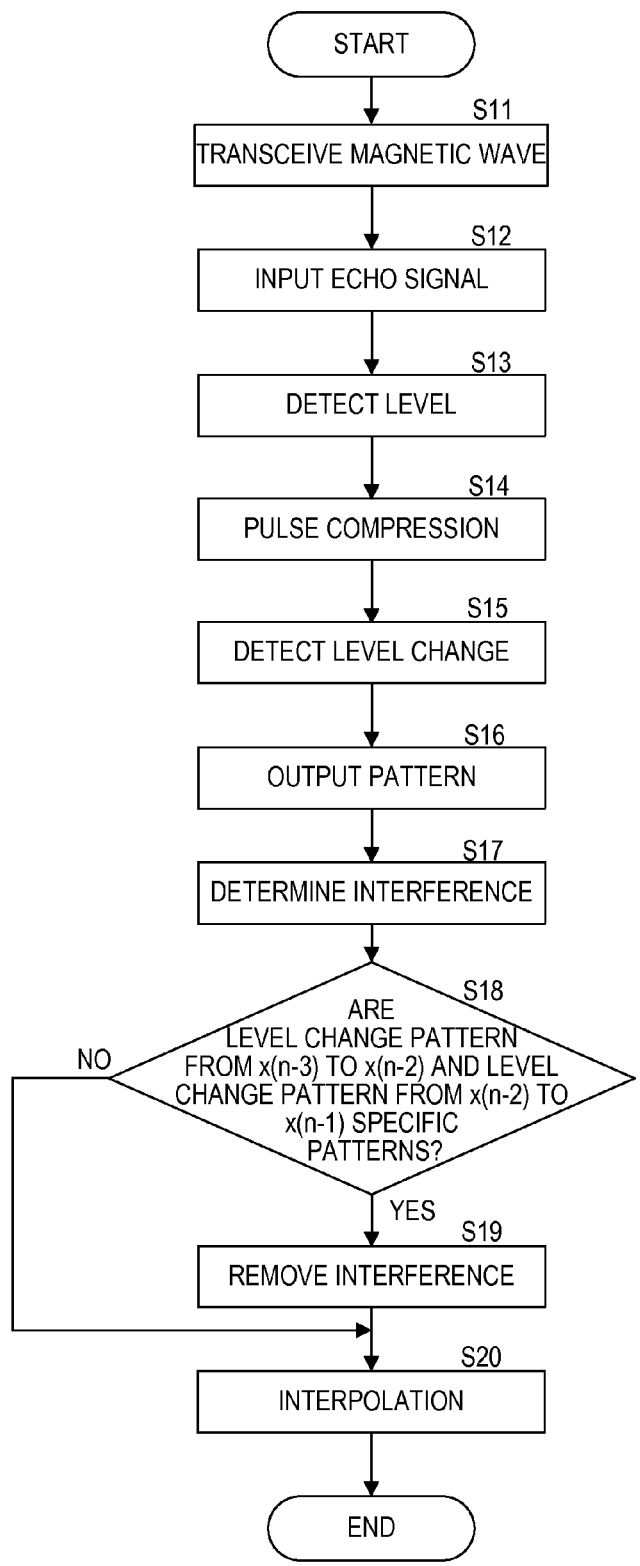
FIG. 7 is a flowchart showing an operation of the radar apparatus.

Hereinafter, the processing contents of the radar apparatus is described in detail with reference to the flowchart in FIG. 7. First, the radar apparatus discharges the electromagnetic wave from the antenna 11 according to the transmission signal outputted from the transmitter 10, and receives the reception signal by the antenna 11 (S11). Next, the receiver 12 is inputted with the reception signal received by the antenna 11 (S12), and performs level detection processing of outputting a value corresponding to the level of the reception signal (S13). The value corresponding to the level of the reception signal is converted into the digital value and stored in the sweep memory 14. Lastly, the signal processor 15 performs the pulse compression, an interference detection, an interference removal, and interpolation processing by the functional components shown in FIGS. 1B and 1C.

Figure 1B:
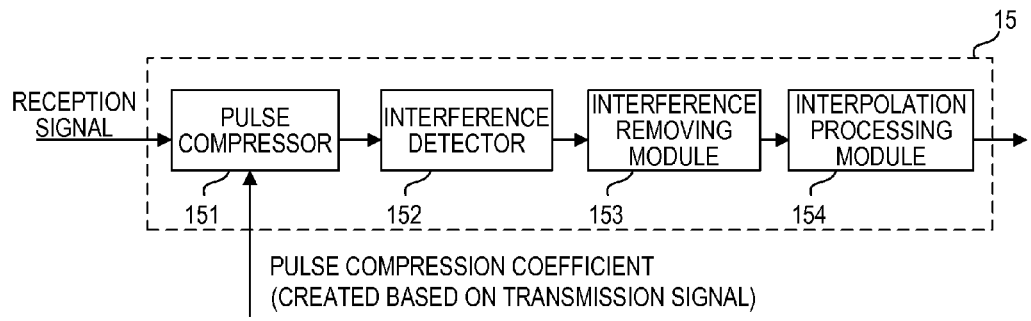

FIG. 1B is a block diagram showing a configuration of the signal processor 15. The signal processor 15 includes a pulse compressor 151, an interference detector 152, an interference removing module 153 (signal level controlling module in the claims), and an interpolation processing module 154.

The pulse compressor 151 is a matched filter to which the transmission signal is set as a filter coefficient (FIR filter), correlates the inputted sweep data (reception signal) with the transmission signal, and performs the pulse compression (S14). The pulse compression is performed for every sweep (for each sweep data). The pulse-compressed sweep data is inputted to the interference detector 152.

Figure 1C:
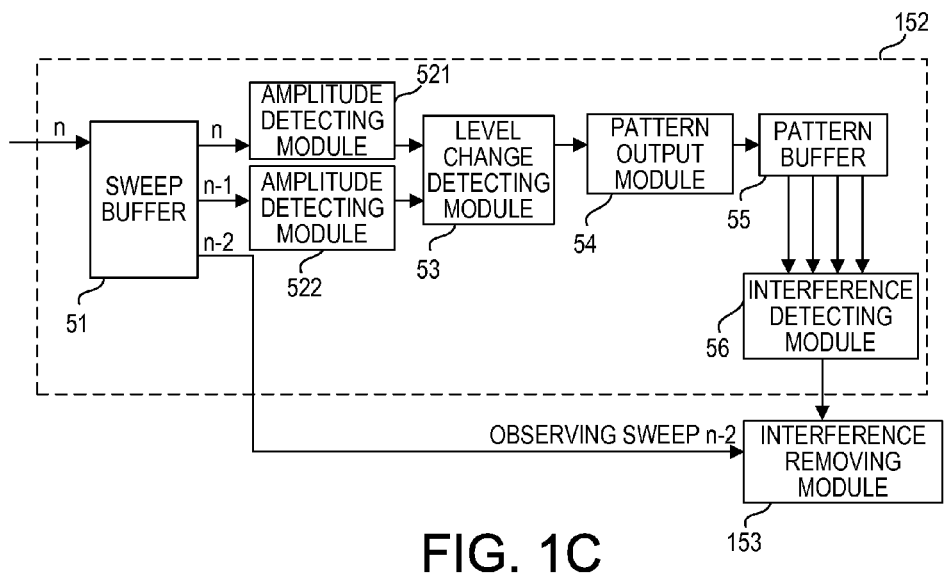

FIG. 1C is a block diagram showing a configuration of the interference detector 152. The interference detector 152 includes a sweep buffer 51, an amplitude detecting module 521, an amplitude detecting module 522, a level change detecting module 53, a pattern output module unit 54, a pattern buffer 55, and an interference detecting module 56. The signal processor 15 detects the interference component contained in the pulse-compressed sweep data and performs the level reduction by these components.

The pulse-compressed sweep data is inputted to the sweep buffer 51. Since the pulse compression is performed for every sweep, the sweep buffer 51 is inputted with new sweep data every time the pulse compression of each sweep is performed. In this example, the sweep buffer 51 stores sweep data for previous two sweeps (data of a sweep n−1 and data of a sweep n−2).

An amplitude (level) of data of a current sweep n is detected by the amplitude detecting module 521, and an amplitude (level) of data of the sweep n−1 immediately previous to the current sweep n is detected by the amplitude detecting module 522. Data of the sweep n−2 which is two sweeps before the sweep n is inputted to the interference removing module 153.

The level change detecting module 53 is inputted with the amplitude data of the sweep n and sweep n−1 from the amplitude detecting modules 521 and 522, and detects a level change between the data of the sweeps at each distance (S15). Regarding the same distance, when the amplitude data of the sweep n is x(n) and the amplitude data of the sweep n−1 is x(n−1), the level change detecting module 53 obtains the level difference between the sweeps x(n)-x(n−1) for all the samples.

Next, the pattern output module 54 classifies the level change between the sweeps obtained by the level change detecting module 53 into one of a plurality of patterns (S16). FIGS. 3A to 3D are charts showing the patterns of the level change between the samples of the sweeps. As shown in FIGS. 3A to 3D, the pattern output module 54 classifies the level change between the sweeps into one of three patterns determined by the following Statement (1).

$$\begin{cases} \text{if} & x(n) - x(n-1) < thresholdN \text{ then } PaternN \\ \text{else if} & x(n) - x(n-1) > thresholdP \text{ then } PaternP \\ \text{else} & PaternZ \end{cases} \quad (1)$$

Figure 3A:
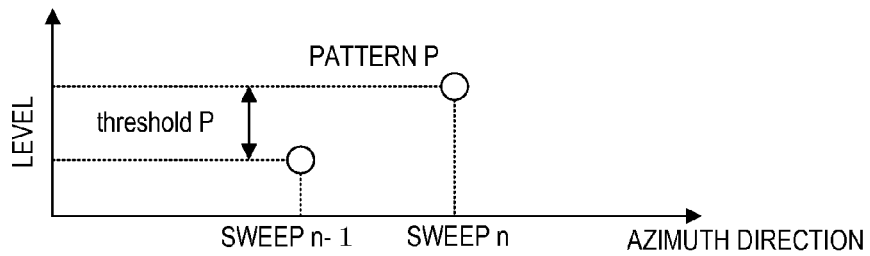
FIGS. 3A to 3D are charts showing patterns of a level change between sweeps.

Specifically, as shown in FIG. 3A, the pattern output module 54 classifies the level change as a pattern P (positive change) when the level of the sample x(n) of the next sweep is higher than the level of the data x(n−1) of the sweep n−1 by over a predetermined value (when the level difference is larger than a predetermined threshold threshold P). Note that, "threshold P" in other figures indicates that the level difference between the samples of the sweeps is the value of threshold P or larger.

Figure 3B:
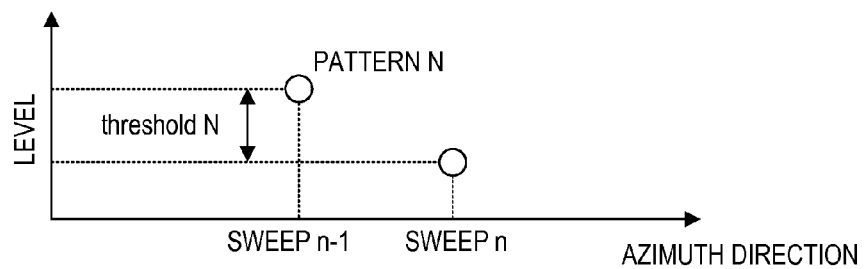
Figure 3C:
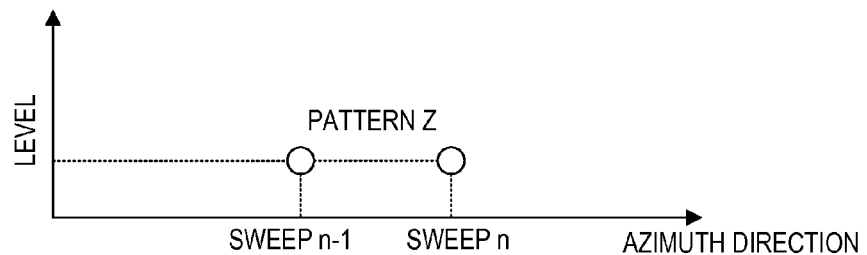
Figure 3D:
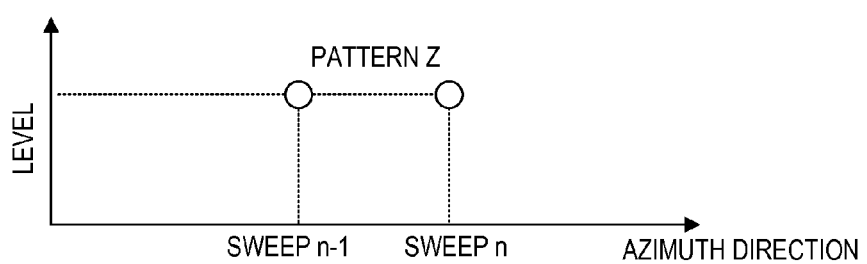

As shown in FIG. 3B, the pattern output module 54 classifies the level change as a pattern N (negative change) when the level of the data x(n) is lower than the level of the data x(n−1) by over a predetermined value (when the level difference is smaller than a predetermined threshold threshold N). Note that, threshold P>threshold N, and "threshold N" in other figures indicates that the level difference between the sweeps is the value of threshold N or smaller. As shown in FIGS. 3C and 3D, when the level change is not applicable to the pattern N nor pattern P (i.e., when the level change between the sweeps is small), it is classified as a pattern Z.

Each level change pattern classified as above is outputted to the patter buffer 55 to be stored. The pattern buffer 55 stores three level change patterns in the past. Specifically, the pattern buffer 55 stores a level change pattern from a sweep n−4 to a sweep n−3, a level change pattern from the sweep n−3 to the sweep n−2, and a level change pattern from the sweep n−2 to the sweep n−1. Since each level change pattern is one of the three kinds of patterns P, N and Z, only a resolution of 2 bits is required, which is significantly smaller than the number of bits of the conventional level resolution for a reception signal (e.g., 16 bits). Therefore, a memory with a high capacity for the interference detection is not needed.

The interference determining module 56 is inputted with a level change pattern from the sweep n−1 to the sweep n acquired in a current update, in addition to the three previous level change patterns stored in the pattern buffer 55.

The interference determining module 56 performs interference determination on each sample data (sample) of the observing sweep data n−2 based on the plurality of level change patterns inputted from the pattern buffer 55 (S17).

FIGS. 4A to 5D are charts showing level change patterns determined as interference. The interference determining module 56 determines whether the data x(n−2) of the observing sweep n−2 is interference based on the level change pattern of a plurality of samples continuous in the azimuth direction (in this example, five adjacent samples) (S18).

Figure 4A:
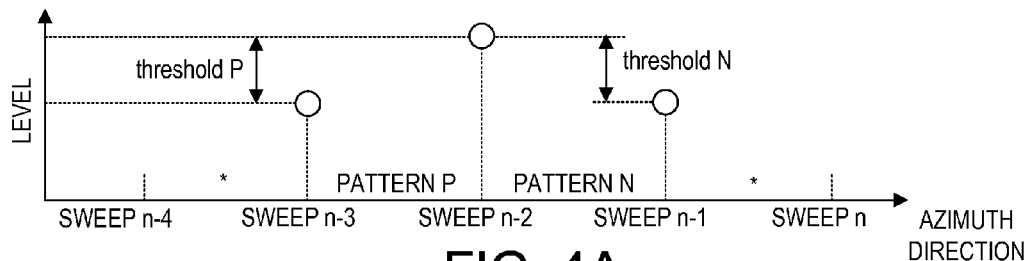
FIGS. 4A to 4E are charts showing level change patterns when an interference determination is performed using five continuous sweep data in an azimuth direction.

When the level change of the observing sweep from the immediate previous sweep to the observation sweep is the pattern P and the level change from the observation sweep to the next sweep is the pattern N as shown in FIG. 4A, the interference determining module 56 determines as interference regardless of the level change of the other portions (from the sample of the sweep n−4 to the sample of the sweep n−3, and from the sample of the sweep n−1 to the sample of the sweep n).

Interference has the characteristic in which its level sharply falls after sharply rising in the azimuth direction. Therefore, the interference determining module 56 can accurately extract only the interference component by extracting the level change pattern peculiar to interference.

Figure 4B:
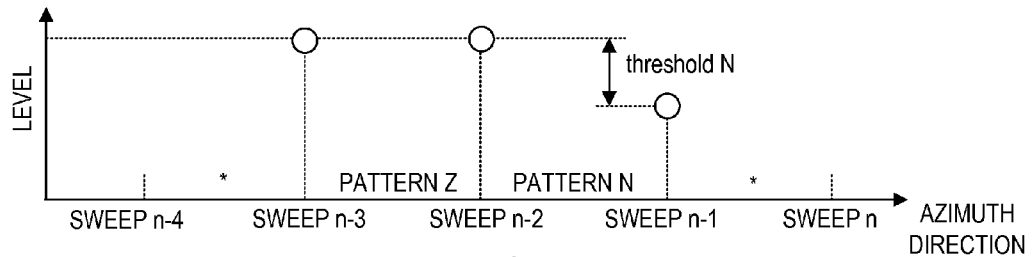
Figure 4C:
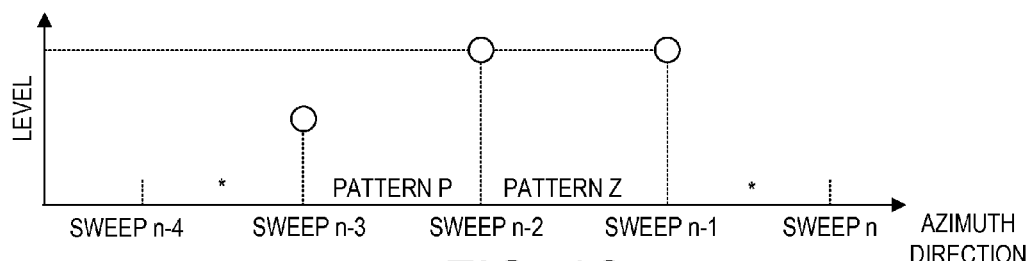

When the level change of the observing sweep from the immediate previous sweep to the observation sweep is the pattern Z and the level change from the observation sweep to the next sweep is the pattern N as shown in FIG. 4B, the interference determining module 56 determines as interference regardless of the level change of the other portions. When the level change of the observing sweep from the immediate previous sweep to the observation sweep is the pattern P and the level change from the observation sweep to the next sweep is the pattern Z as shown in FIG. 4C, the interference determining module 56 determines as interference regardless of the level change of the other portions.

Figure 4D:
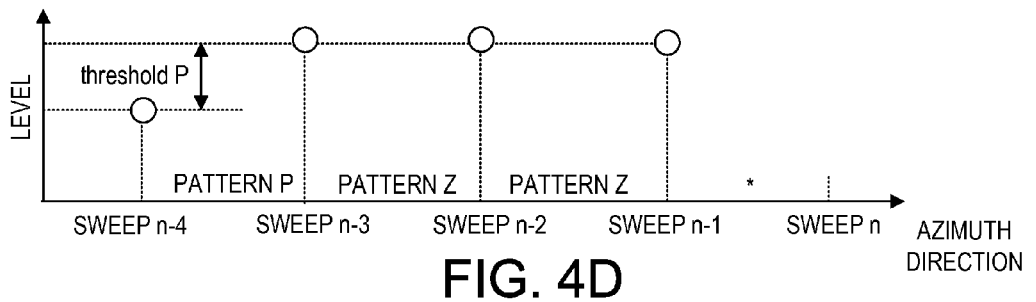
Figure 4E:
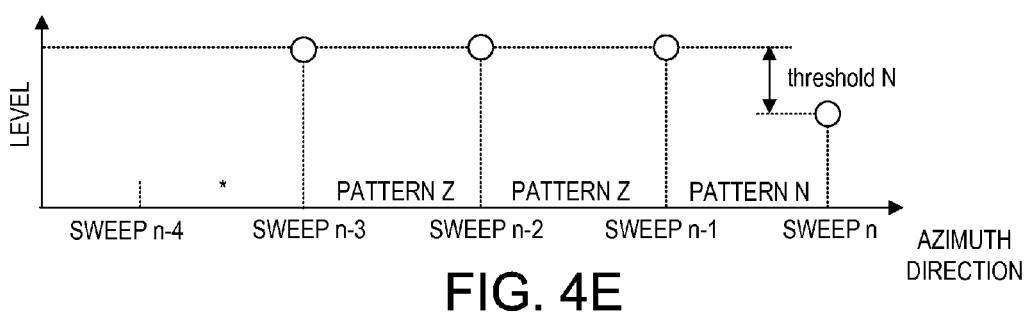

When both the level change of the observing sweep from the immediate previous sweep to the observation sweep and the level change from the observation sweep to the next sweep are the pattern Z and the change pattern from the data x(n−4) to the data x(n−3) is the pattern P as shown in FIG. 4D, the interference determining module 56 determines as interference. Similarly, when both the level change of the observing sweep from the immediate previous sweep to the observation sweep and the level change from the observation sweep to the next sweep are the pattern Z and the change pattern from the data x(n−1) to the data x(n) is the pattern N as shown in FIG. 4E, the interference determining module 56 determines as interference. Thus, the interference when substantially the same levels continue in the azimuth direction can also be detected.

Figure 5A:
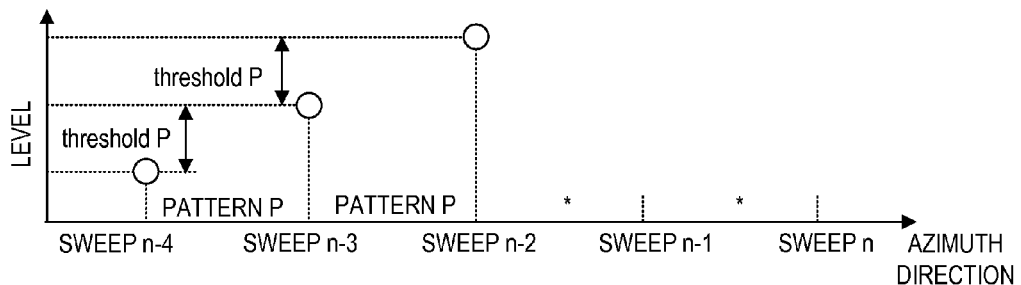
FIGS. 5A to 5D are charts showing level change patterns when the interference determination is performed using five continuous sweep data in the azimuth direction.
Figure 5B:
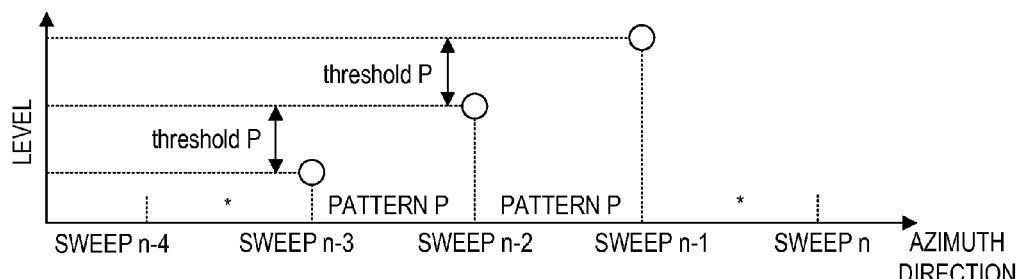
Figure 5C:
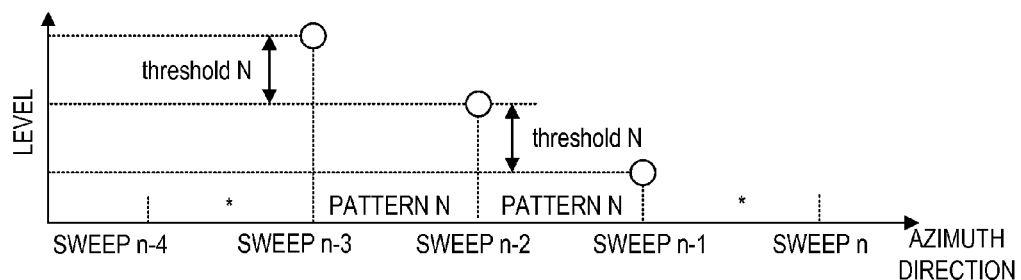
Figure 5D:
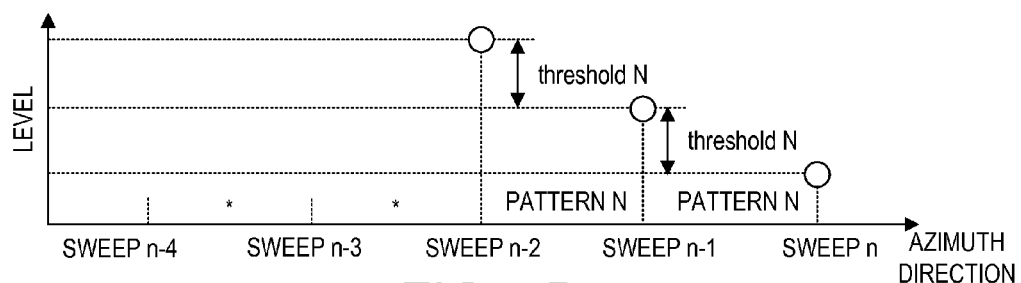

Additionally, it may also be determined as interference when the change pattern continues to be the pattern P or the pattern N in the azimuth direction as follows. Specifically, the interference determining module 56 determines as interference when, as shown in FIG. 5A, the level change pattern from the data x(n−4) to the data x(n−3) is the pattern P and the level change pattern from the data x(n−3) to the data x(n−2) is the pattern P, or when, as shown in FIG. 5B, the level change pattern from the data x(n−3) to the data x(n−2) is the pattern P and the level change pattern from the data x(n−2) to the data x(n−1) is the pattern P. Furthermore, it is also determined as interference when, as shown in FIG. 5C, the level change pattern from the data x(n−3) to the data x(n−2) is the pattern N and the level change pattern from the data (x−2) to the data x(n−1) is the pattern N. It is also determined as interference when, as shown in FIG. 5D, the level change pattern from the data x(n−2) to the data x(n−1) is the pattern N and the level change pattern from the data x(n−1) to the data x(n) is the pattern N. In these cases, interference having difference levels in the azimuth direction can be detected.

The number of sweep data used for the determination is not limited to the above example. For example, the interference determination can also be performed by setting the sweep n−1 as the observing sweep and using three sweeps including the observing sweep n−1, the current sweep n, and the sweep n−2 which is two sweeps before the sweep n. In this case, among the functional components in FIG. 1C, the sweep buffer 51 stores only the data of the sweep n−1 and outputs it to the interference removing module 153. The pattern buffer 55 stores only one level change pattern in the past (e.g., the level change pattern from the sweep n−2 to the sweep n−1). The interference determining module 56 is inputted with the level change pattern from the sweep n−2 to the sweep n−1 and the level change pattern from the sweep n−1 to the sweep n acquired from the current update.

Figure 6A:
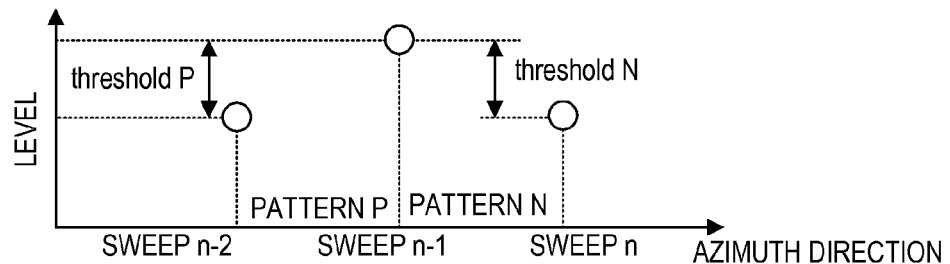
FIGS. 6A to 6C are charts showing level change patterns when the interference determination is performed using three continuous sweep data in the azimuth direction.

When the three sweep data is used, the interference determination is performed as follows. For example, as shown in FIG. 6A, when the level change pattern from the data x(n−2) to the data x(n−1) is the pattern P and the level change pattern from the data x(n−1) to the data x(n) is the pattern N, it is determined that interference has occurred in the data x(n−1) of the observing sweep n−1.

Figure 6B:
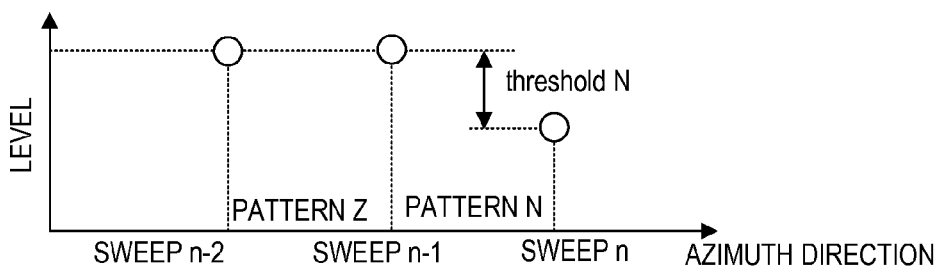
Figure 6C:
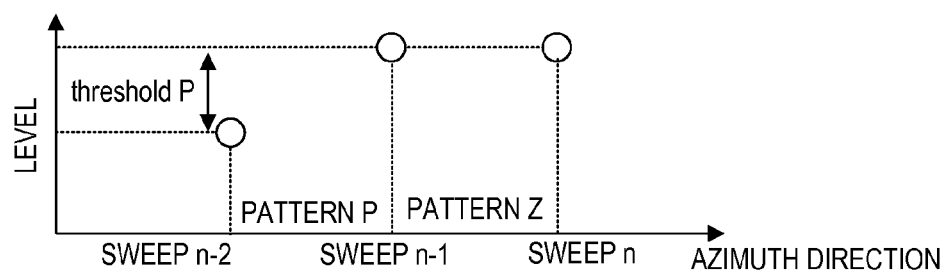

Since interference may occur continuously for a plurality of times in the azimuth direction, it may also be determined that interference has occurred when the change pattern from the data x(n−2) to the data x(n−1) is the pattern Z and the level change pattern from the data x(n−1) to the data x(n) is the pattern N as shown in FIG. 6B, or when the change pattern from the data x(n−2) to the data x(n−1) is the pattern P and the level change pattern from the data x(n−1) to the data x(n) is the pattern Z as shown in FIG. 6C.

A configuration may be adopted, which changes a mode of the determination between a case where the determination is performed with the three sweep data and a case where the determination is performed with the five sweep data according to the occurrence frequency of interference. For example, the determination is normally performed with the five sweep data, and when a plurality of continuous samples in the azimuth direction is determined as interference, it switches to the determination with three sweep data.

In the above example, although only the level changes in the azimuth direction are taken into consideration, the determination may be performed by taking the level changes in the distance direction into consideration. In this case, a change pattern is calculated, for example, using a sample averaged in the distance direction, as the following Statement (2).

$$\begin{cases} \text{if} & \frac{1}{W}\sum_{r}^{W}\{x(n)-x(n-1)\} < thresholdN \quad \text{then} \quad PaternN \\ \text{else if} & \frac{1}{W}\sum_{r}^{W}\{x(n)-x(n-1)\} > thresholdP \quad \text{then} \quad PaternP \\ \text{else} & \qquad\qquad\qquad\qquad\qquad\qquad\qquad\qquad PaternZ \end{cases} \quad (2)$$

In many cases, interference causes high level signals over a plurality samples in the distance direction, in addition to having the characteristic in which its signal level sharply falls after sharply rising in the azimuth direction. Therefore, the level change detecting module 53 averages the level changes among the samples by using the signals in the distance direction. The pattern output module 54 classifies the averaged level change into one of a plurality of patterns, and as in Statement (2), calculates the change patterns using the sample obtained by averaging a plurality of samples in the distance direction. By using such a configuration, falsely detecting a low level signal that is short in the distance direction as interference can be prevented.

Figure 8A:
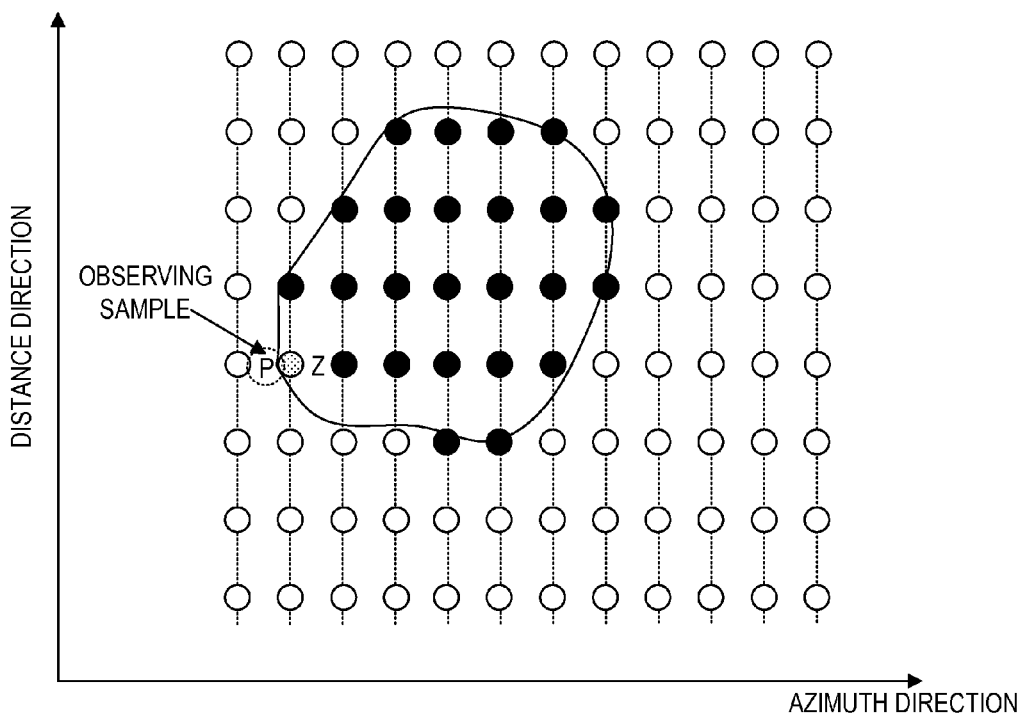
FIGS. 8A and 8B are views showing classifications of change patterns taking samples in a distance direction into consideration.
Figure 8B:
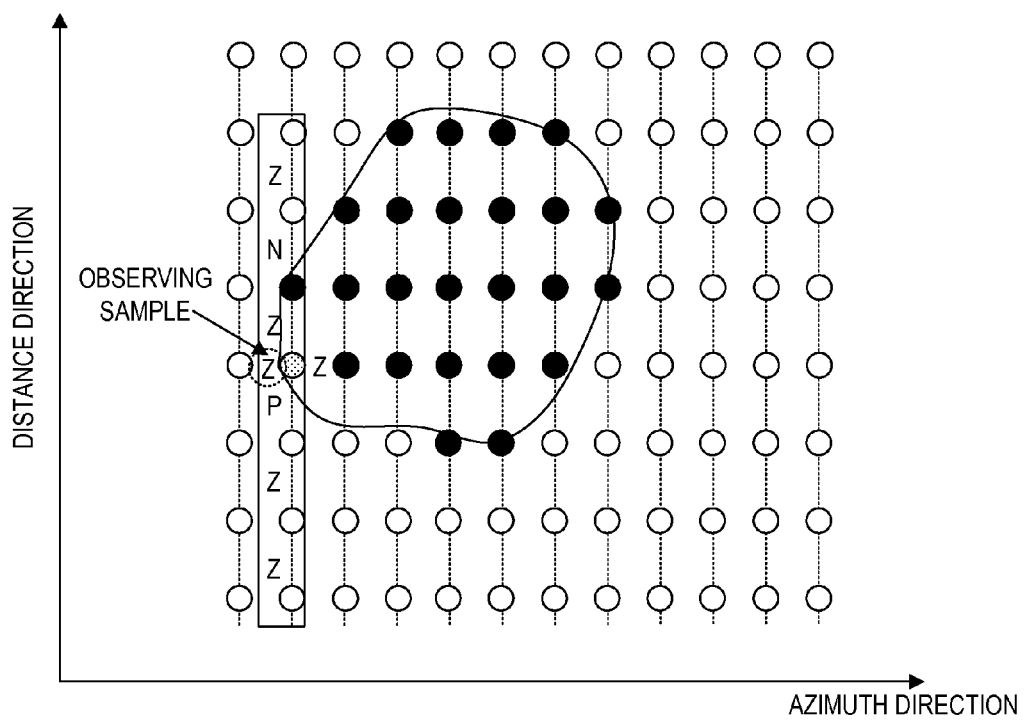

Further, the determination may be performed by taking the level changes in the distance direction shown in FIGS. 8A and 8B into consideration. Here, as shown in FIG. 8A, the level change detecting module 53 detects a level change between samples adjacent to each other in the azimuth direction. The pattern output module 54 classifies the level change in the azimuth direction into one of a plurality of patterns (patterns P, N and Z). Further, as shown in FIG. 8B, the level change detecting module 53 also detects the level change between samples adjacent to each other in the distance direction, for each of the samples in the azimuth direction. Further, the pattern output module 53 classifies the level change in the distance direction into one of a plurality of patterns (patterns P, N and Z).

Moreover, with reference to a plurality of level change patterns (e.g., six adjacent patterns) in the distance direction for each sample, the pattern output module 54 classifies the most frequent level change pattern as the change pattern for the azimuth direction. For example, as shown in FIG. 8A, for a certain observing sample, even if a level change pattern from a sample of a sweep immediately previous to the observing sample is the pattern P, as shown in FIG. 8B, the pattern output module 54 replaces the pattern P by the pattern Z which is the most frequent level change pattern among the six adjacent patterns in the distance direction. As a result, the observing sample which is to be falsely determined as interference (the change from the pattern N to the pattern Z) when using only the determination in the azimuth direction can be determined that it is not interference.

Furthermore, a determination of level changes in the distance direction may be performed in addition to the determination of the level changes in the azimuth direction. For example, a sample is determined as interference when its level change patterns in the azimuth direction change from the pattern P to the pattern N, the pattern P to the pattern Z, or the pattern Z to the pattern N, and the level change patterns in the distance direction are the pattern Z.

Alternatively, without limiting the number of the observing sample to only one, a plurality of samples in the azimuth and distance directions may be used as observing samples and the determination of interference may be performed based on a two-dimensional level change pattern. In this case, the determination of interference is performed by storing the two-dimensional level change pattern (reference) which is to be determined as interference in a memory (not illustrated) in advance and comparing the observing samples with the reference. Here, the fuzzy reasoning or the neural network may be used as the pattern matching method.

Note that, in this embodiment, the thresholds (threshold P and threshold N) of the level changes are fixed values. However, they may adaptively be changed. For example, when a gain of a reception signal is changed between sweeps, the threshold may be changed corresponding to the difference in gain between the sweeps (i.e., the threshold considering a gain ratio).

Further, the level changes of the sweep data adjacent to each other in the azimuth direction and/or the distance direction are detected. However, alternatively, respective level changes between two sweep data adjacent to each other may be detected by ignoring (thinning out) data of, for example, every other sweep.

Next, the interference removing module 153 performs the level control processing (interference removing processing) of the data of the sweep n−2 which is determined as interference by the interference determining module 56 (S19).

The interference removing processing reduces the level of the data determined as interference. Specifically, the zero-replacement processing, the processing of replacing by one of the adjacent data thereto in the azimuth direction, or the processing of replacing by an average value of adjacent data in the azimuth direction may be applied.

By performing such processing described above, the interference removing module 153 performs the interference removing processing of the sweep data corresponding to a position determined as interference, and updates the sweep data. Note that, for example, when the zero-replacement is performed as the interference removing processing, an image with a lack of echo image in the distance direction regarding a certain azimuth is displayed, resulting in degrading the display quality (e.g., see FIG. 9C).

Therefore, the interpolation processing module 154 interpolates the sweep data in the azimuth direction (S20). Although the interpolation processing may be linear interpolation in the azimuth direction or, as described above, the replacement by one of the adjacent data in the azimuth direction or the replacement by the average value of the adjacent data in the azimuth direction, it is preferred to interpolate by performing a coherent integration as follows. Specifically, the interpolation processing module 154 performs coherent integration on the interference-removed sweep data outputted from the interference removing module 153. In the coherent integration, a data row corresponding to a plurality of sweeps at the same distance from the ship (the data row considered to be coherent) is integrated for each sweep data. The coherent integration may be simple addition (simple integration), or may be digital filtering, such as FFT (Fast Fourier Transform) or DFT (Discrete Fourier Transform).

This coherent integration is performed for each discrete value of the sweep data, as well as for each sweep data in all directions. When the relative speed of the target object is zero, the echo signals from the target object have the same phase between sweeps, and the level of the signal increases by the coherent integration. When the target object has the relative speed, the echo signal changes in its phase by a constant amount between sweeps, and the level of the signal increases by the digital filtering, such as the FFT or the DFT. However, since the phase of a noise component generally changes random in every sweep, the level of the noise component is suppressed by the coherent integration. Therefore, the S/N can be improved by performing the coherent integration. Thus, since the coherent integration leads to similar result as performing moving average processing in the azimuth direction, the zero-replaced signal in the interference removal is averaged in the azimuth direction and is interpolated, as well as the S/N is improved.

Figure 9A:
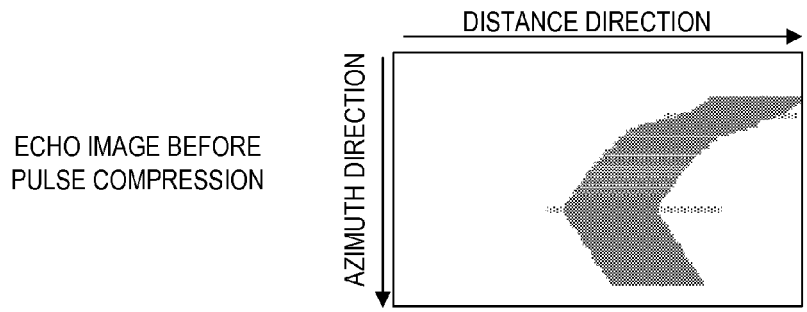
FIGS. 9A to 9D are schematic views showing an example of echo images when signal processing of the present invention is performed.
Figure 9B:
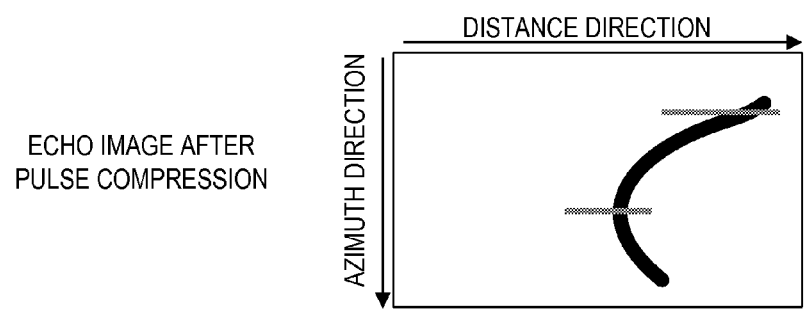
Figure 9C:
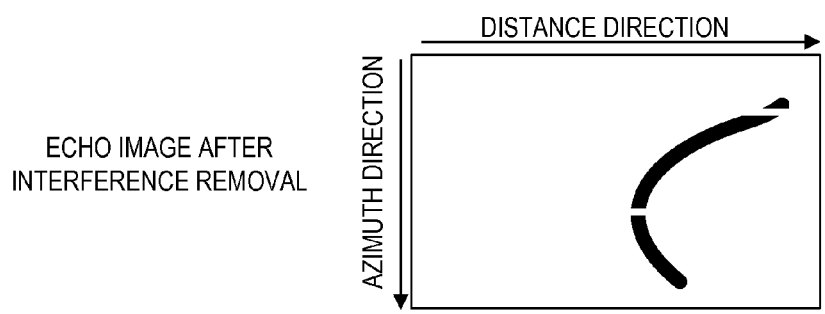
Figure 9D:
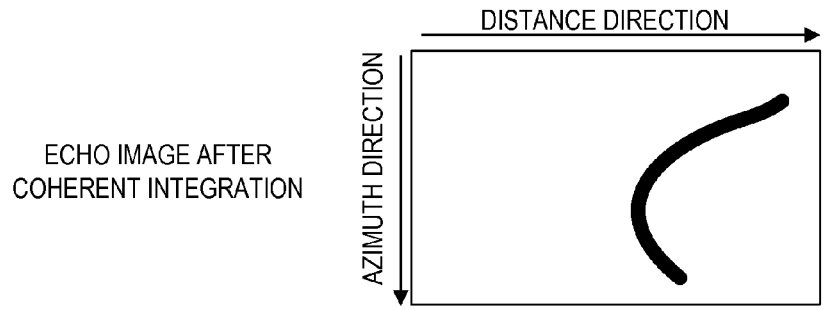

The effects caused from the pulse compression, interference removal, and interpolation processing of this embodiment are described with reference to FIGS. 9A to 9D. FIG. 9A is a schematic view showing an echo image before the pulse compression. FIG. 9B is a schematic view showing the echo image after the pulse compression. FIG. 9C is a schematic view showing the echo image after the interference removal. FIG. 9D is a schematic view showing the echo image after the interpolation processing.

As shown in the schematic views, the interference component remains to have the characteristic in which its level sharply falls after sharply rising in the azimuth direction. Therefore, when the interference removal (e.g., zero-replacement) is performed, the image with a lack of echo image in the distance direction regarding a certain azimuth is displayed. However, in the signal processing of this embodiment, the level of the reception signal does not rapidly decrease regarding a certain azimuth even if the interference removal is performed after the pulse compression, due to performing the coherent integration after the zero-replacement. Thus, an appropriate pulse compression can be performed while subsiding the influence of interference.

Figure 2:
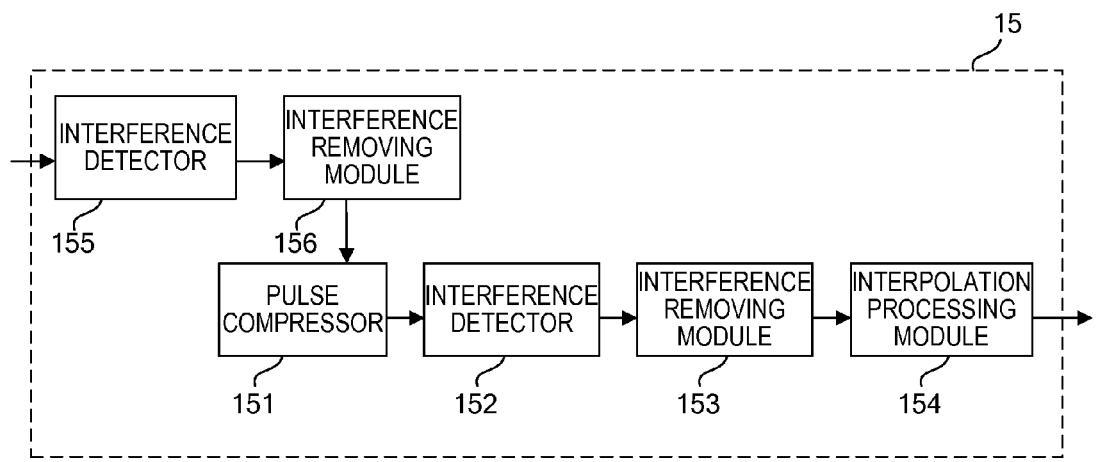
FIG. 2 is a block diagram showing a configuration of a signal processor when performing an interference detection and an interference removal before a pulse compression.

In the above embodiment, the example of performing the interference detection and removal after the pulse compression is shown; however, as shown in FIG. 2, interference detection and removal may be performed also before the pulse compression. In this case, the signal processor 15 includes, in addition to the configuration of the signal processor 15 shown in FIG. 1B, an interference detector 155 for inputting the reception signal (sweep data) and an interference removing module 156 for removing the interference component detected by the interference detector 155. In the example of FIG. 2, the reception signal after the interference removal (e.g., zero-replacement) by the interference removing module 156 is inputted to the pulse compressor 151 and pulse compressed. The interference detector 155 has the similar configuration and function to the interference detector 152 shown in FIG. 1C, and the interference removing module 156 has the same configuration and function to the interference removing module 153. Therefore, the configurations and functions of the interference detector 155 and the interference removing module 156 are omitted.

By performing the interference detection and removal before the pulse compression as described above, in a situation where the echo from the target object is not included in the reception signals (only noise) and the interference component is contained in the reception signal, by the zero-replacement, an unnecessary component such as interference will not be produced after the pulse compression. In this case, since interference will not be detected in the interference detection processing after the pulse compression, and therefore, another processing, such as interference removal, will not be newly required after the pulse compression. Note that, in the situation where the echo from the target object is contained in the reception signal, the even when the interference removing processing is performed before the pulse compression, the signal will be partially lacked from the echo, and there is a possibility that an unnecessary high level signal other than the actual echo (two-dimensional interference) is produced due to the correlation processing of the pulse compression. Note that, even when such two-dimensional interference is produced as described above, by the interference detection processing after the pulse compression, it will again be detected as an interference component. Since the removing processing and the interpolation processing are performed based on this detection, an appropriate signal as an echo can be obtained.

In the foregoing specification, specific embodiments of the present invention have been described. However, one of ordinary skill in the technique appreciates that various modifications and changes can be performed without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:
1. A signal processing device, comprising:
 a signal input unit configured to receive reception signals obtained from transmission signals reflecting on one or more objects;
 a pulse compressor configured to pulse compress the reception signals;

an interference detector configured to detect a reception signal caused by interference, from the pulse-compressed reception signals;

a signal level controller configured to control a level of the detected reception signal; and an interpolation processing module configured to interpolate the level-controlled reception signal in an azimuth direction.

2. The device of claim 1, wherein the interpolation processing module interpolates the level-controlled reception signal in the azimuth direction by integrating the level-controlled reception signals.

3. The device of claim 1, wherein the interference detector also detects a signal caused by interference before the pulse compression, from the reception signals inputted into the signal input unit, and the signal level controller controls the level of the reception signal detected by the interference detection before the pulse compression.

4. The device of claim 1, wherein the interference detector includes:

a level change detecting module configured to detect a level change between the reception signals from sampling locations close to each other where the distances from an antenna are substantially the same but the azimuths from the antenna are different, the antenna receiving the reception signals;

a pattern output module configured to compare the level change with a predetermined reference pattern and outputting a level change pattern; and an interference determining module configured to determine the interference based on at least two of the level change patterns.

5. The device of claim 4, wherein the pattern output module compares the level change of the reception signals from adjacent sampling locations with the predetermined reference pattern.

6. The device of claim 4, wherein the pattern output module classifies the pattern into one of a first pattern in which the level change exceeds a first threshold, a second pattern in which the level change is below a second threshold, and a third pattern in which the level change applies to neither the first pattern nor the second pattern.

7. The device of claim 6, wherein the interference determining module outputs an identified signal indicating interference when the pattern changes from the first pattern to the second pattern.

8. The device of claim 6, wherein the interference determining module outputs an identified signal indicating interference when the pattern changes from the first pattern to the third pattern.

9. The device of claim 6, wherein the interference determining module outputs an identified signal indicating interference when the pattern changes from the third pattern to the second pattern.

10. The device of claim 4, wherein the level change is based on a difference value between the levels of the reception signals adjacent to each other in the azimuth direction.

11. The device of claim 6, wherein the interference determining module outputs an identified signal indicating interference when the third pattern following the first pattern and a group of at least two of the third patterns exist continuously.

12. The device of claim 6, wherein the interference determining module outputs an identified signal indicating interference when a group of at least two of the third patterns exist continuously and the second pattern following the third pattern exists.

13. The device of claim 6, wherein the interference determining module outputs an identified signal indicating interference when a group of at least two of the first patterns continuously exist.

14. The device of claim 6, wherein the interference determining module outputs an identified signal indicating interference when a group of at least two of the second patterns continuously exists.

15. The device of claim 1, wherein the level change detector averages the level changes in the distance direction, and the pattern output module compares the averaged level change with the level change pattern.

16. The device of claim 1, wherein the level change detector further detects a level change between the reception signals from locations close to each other where the azimuths from an antenna are substantially the same but the distances from the antenna are different, the antenna receiving the reception signals, and the pattern output module outputs the most frequent level change pattern within a predetermined distance range as the level change pattern for the azimuth and the distance.

17. The device of claim 1, wherein the level change detector further detects a level change between the reception signals from locations close to each other where the azimuths from an antenna are substantially the same but the distances from the antenna are different, the antenna receiving the reception signals, and the interference determining module further determines interference based on a plurality of level change patterns close to each other in the distance direction.

18. The device of claim 1, wherein the signal level controlling module performs zero conversion on the level of the reception signal caused by interference.

19. A radar apparatus, comprising:

an antenna for discharging transmission signals using electromagnetic waves respectively in each azimuth, and configured to receive signals obtained by reflecting on one or more objects;

a pulse compressor configured to pulse compress the reception signals;

an interference detector configured to detect a signal caused by interference from the pulse-compressed reception signals;

a signal level controller configured to control a level of the reception signal caused by interference that is detected by the interference detector; and an interpolation processing module configured to interpolate the level-controlled reception signal in an azimuth direction.

* * * * *